UNITED STATES PATENT OFFICE.

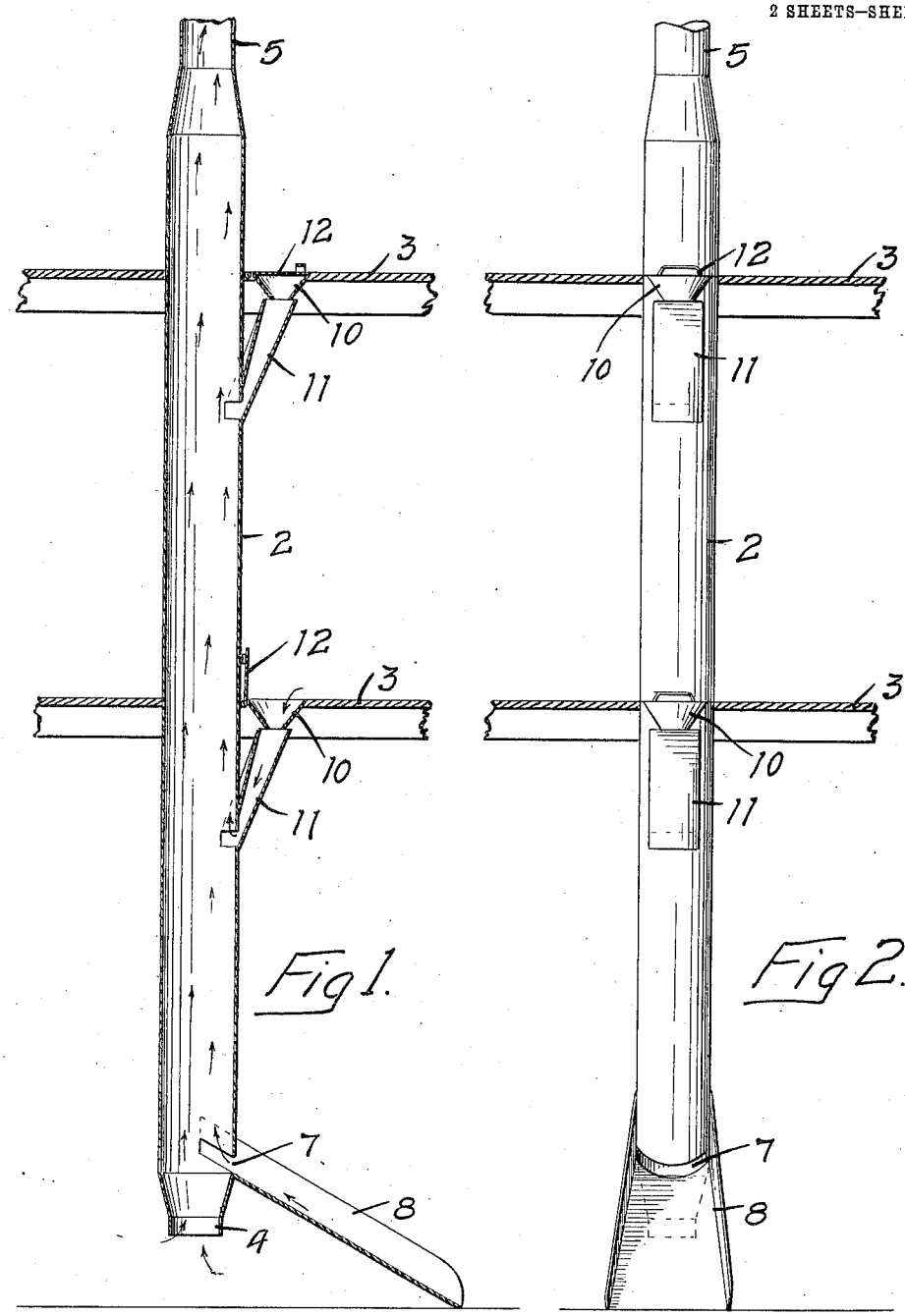

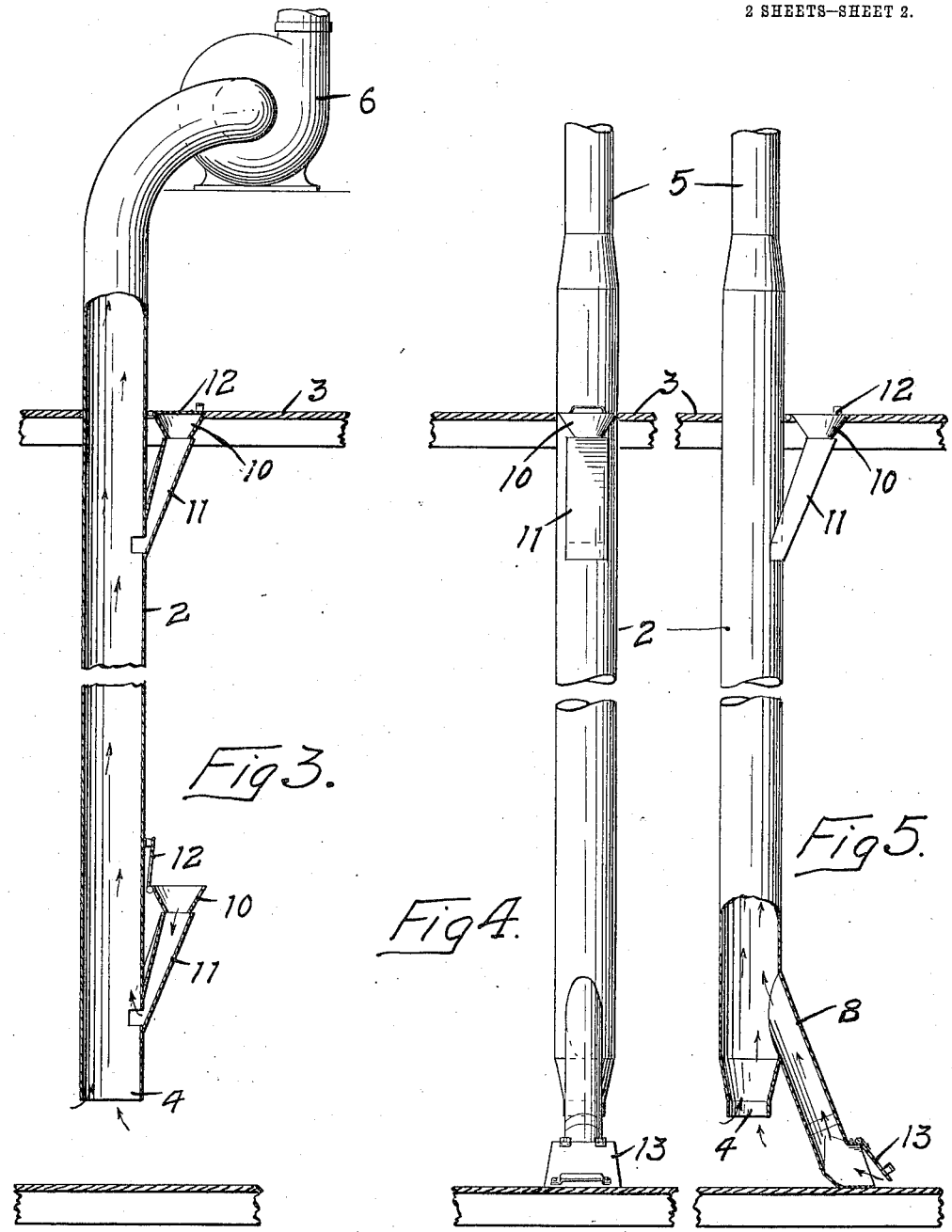

FRANCIS H. DAY, OF MINNEAPOLIS, MINNESOTA.

DUST AND GRAIN SEPARATOR.

1,030,875. Specification of Letters Patent. Patented July 2, 1912.

Application filed June 22, 1908. Serial No. 439,668.

*To all whom it may concern:*

Be it known that I, FRANCIS H. DAY, of Minneapolis, county of Hennepin, State of Minnesota, have invented certain new and useful Improvements in Dust and Grain Separators, of which the following is a specification.

This invention relates to improvements in devices designed for use in grain storage elevators, or grain cleaning houses for the purpose of separating the dust and grain obtained from the floor sweepings, and carrying the dust to be taken up and delivered to a suitable dust-collecting system.

The invention consists generally in the constructions and combinations hereinafter described and particularly pointed out in the claims.

In the accompanying drawings, forming part of this specification; Figure 1 is a vertical section of a dust and grain separator embodying my invention. Fig. 2 is a side elevation of the same. Fig. 3 is a view similar to Fig. 1 showing a modified construction and showing also the fan connection. Figs. 4 and 5 are elevations showing another modification.

In all of the drawings, 2 represents the main suction pipe or conduit, which is arranged, preferably, in a vertical position, and which, preferably, extends through several of the floors 3 of the grain elevator or cleaning house and has its open lower end 4 arranged a short distance above the lower floor of said elevator or house. The upper end of the pipe 2 is connected by a suitable pipe or conduit 5 to a suction fan 6 from which the dust, light material and air are discharged into a suitable dust collecting system which permits or secures a separation of the dust and light material from the air.

The lower end of the pipe 2 has a slot 7 in its wall and an inclined open chute 8 extends from the floor to the outer wall of said pipe opposite said slot (see Figs. 1 and 2) which permits sweepings from said lower floor, consisting of dust and loose kernels of grain, to be swept upward in said chute and, through said slot, into said pipe. As the sweepings enter said pipe the dust and light material will be caught by the current of air which is caused by said fan to travel upward in said pipe and to be thrown into the dust-collecting system. The loose kernels of grain, being heavier than the dust, will drop down through the open lower end of the pipe onto the floor, and can then be delivered to a cleaning machine or a storage bin.

Both the upper and the lower ends of the pipe are preferably contracted, thereby causing the air to expand in the main part of the pipe 2 which acts, in fact, as an expansion chamber, and permitting the heavier material to drop through the pipe and fall out of its lower end. I also prefer to provide a small hopper 10 having its upper edge flush with the surface of each floor, above the lower one, and connecting with the main pipe 2 by a short spout or conductor 11. A cover 12 is preferably provided for each of said hoppers. With this means the dust and scattered grain on each floor above the lower one can be swept directly into the hopper, from which it will pass into the pipe 2 through the spout 11. The covers 12 are kept normally closed so as not to interfere with the upward current of air through the pipe 2.

In Fig. 3 the chute 8 is omitted and an additional hopper 10 is provided located a short distance above the lower end of the pipe 2. With this construction the sweepings from the lower floor must be lifted up and dropped into the hopper. The dust and light material will be taken up by the air current while the heavier kernels of grain will fall through the open lower end of the pipe 2.

In Figs. 4 and 5 the chute 8 is made in the form of a closed pipe having an inclined lower end resting on the floor into which the material may be swept. A hinged door 13 is provided over the opening and when this door is nearly closed the suction will be sufficient to carry all of the sweepings upward through the chute and into the pipe 2.

I do not limit myself to the details of construction as the same may be varied in many particulars without departing from my invention.

I claim as my invention:

1. The combination, with a building having a series of floors, of an upright pipe extending through said floors and having an open lower end near the lower floor, means communicating with said pipe, and adapted to create upward currents of air in said pipe and adapted to communicate with a dust collecting system, a hopper arranged in each floor above the lower end of said pipe and having a spout connection with said pipe, the top of each hopper being substantially flush with the surface of the floor wherein it is arranged to allow the sweepings to be conveniently delivered to each hopper, the currents of air in said pipe separating the dust and like material from the grain kernels delivered with the sweepings to said upright pipe, and a cover arranged to close each of said hoppers, substantially as described.

2. The combination, with a building having a series of floors, of an upright pipe extending therethrough, means connected with the upper portion of said pipe and adapted to communicate with a dust collecting system and adapted to create upward currents of air in said pipe, the lower end of said pipe having a slot in its side wall and depending near one of the floors of said elevator, and an inclined chute having one end resting upon said floor and its other end connected with said pipe beneath said slot, whereby the sweepings on the lower floor may be delivered to said pipe over said chute, a hopper mounted in each floor and having a spout connection with said pipe, and a cover for closing each of said hoppers, substantially as described.

In witness whereof, I have hereunto set my hand this 18th day of June, 1908.

FRANCIS H. DAY.

Witnesses:
C. G. Hanson,
J. A. Byington.

Copies of this patent may be obtained for five cents each, by addressing the "Commissioner of Patents, Washington, D. C."